(12) United States Patent
Torkildsen et al.

(10) Patent No.: US 7,018,451 B1
(45) Date of Patent: *Mar. 28, 2006

(54) FLUID SEPARATION SYSTEM

(75) Inventors: Bernt H. Torkildsen, Bergen-Sandviken (NO); Martin Sigmundstad, Hafrsfjord (NO); Harald Linga, Nesttun (NO); Finn P. Nilsen, Nattland (NO)

(73) Assignee: Statoil ASA, Stavanger (NO)

( * ) Notice: Subject to any disclaimer, the term of this patent is extended or adjusted under 35 U.S.C. 154(b) by 0 days.

This patent is subject to a terminal disclaimer.

(21) Appl. No.: 09/526,317

(22) Filed: Mar. 15, 2000

Related U.S. Application Data (63) Continuation of application No. PCT/GB98/02772, filed on Sep. 14, 1998.

(30) Foreign Application Priority Data

Sep. 15, 1997 (GB) .................................... 9719668
Jun. 5, 1998 (GB) .................................... 9812148

(51) Int. Cl.
*B01D 47/10* (2006.01)
*B01D 53/14* (2006.01)

(52) U.S. Cl. .......................... 95/216; 95/235; 95/236; 96/323; 261/DIG. 54

(58) Field of Classification Search ................ 95/216, 95/235, 236; 96/275, 323, 234, 266, 271, 96/272; 261/DIG. 54
See application file for complete search history.

(56) References Cited

U.S. PATENT DOCUMENTS

| 3,764,654 A | | 10/1973 | Shah |
| 3,912,469 A | * | 10/1975 | Ewan et al. |
| 3,970,740 A | * | 7/1976 | Reeder et al. |
| 4,235,607 A | * | 11/1980 | Kinder et al. |
| 4,239,510 A | * | 12/1980 | Hays et al. |
| 4,279,628 A | * | 7/1981 | Wymer et al. |
| 4,293,524 A | * | 10/1981 | Teller et al. |
| 4,511,544 A | * | 4/1985 | Connell et al. |
| 4,603,035 A | * | 7/1986 | Connell et al. |
| 4,744,958 A | | 5/1988 | Pircon |
| 4,828,768 A | * | 5/1989 | Talmor |
| 5,035,842 A | * | 7/1991 | Mohn |
| 5,135,684 A | * | 8/1992 | Mohn et al. |
| 6,019,820 A | * | 2/2000 | Leverett |
| 6,120,008 A | * | 9/2000 | Littman et al. |
| 6,280,505 B1 | * | 8/2001 | Torkildsen et al. |
| 6,284,023 B1 | * | 9/2001 | Torkildsen et al. |
| 6,284,024 B1 | * | 9/2001 | Torkildsen et al. |

FOREIGN PATENT DOCUMENTS

| EP | 0 200 695 | 11/1986 |
| EP | 0379319 | 9/1996 |
| WO | 90/13859 | 11/1990 |

* cited by examiner

*Primary Examiner*—Duane S. Smith
(74) *Attorney, Agent, or Firm*—Patterson, Thuente, Skaar & Christensen, P.A.

(57) ABSTRACT

A method of removing acid gas components from a gas mixture. Certain embodiments of the method involve bringing the gas mixture into contact with a liquid solvent or reagent for the acid gases in a first turbulent contactor and subjecting the gas mixture and liquid to turbulent mixing conditions. This causes the acid gas to be absorbed by the solvent or reagent. The fluid mixture is passed into a second turbulent contactor and subjected to further turbulent mixing conditions causing further acid gas to be absorbed by the solvent or reagent. Optionally the fluid mixture is separated into a gas phase and liquid phase.

28 Claims, 11 Drawing Sheets

FLUID SEPARATION SYSTEM

CROSS REFERENCE TO RELATED APPLICATIONS

This is a continuation of Application No. PCT/GB98/02772 filed Sep. 14, 1998.

FIELD OF THE INVENTION

The present invention relates to fluid separation systems. It is particularly concerned with the selective removal of a component or components from a mixture of gases using liquid solvent and is more particularly concerned with the absorption of acid gases such as $CO_2$, $NO_x$, $H_2S$, oxides of sulphur etc. from natural gas and from combustion gases.

The present invention relates to fluid separation systems. It is particularly concerned with the selective removal of a component or components from a mixture of gases using liquid solvent and is more particularly concerned with the absorption of acid gases such as $CO_2$, $NO_x$, $H_2S$, oxides of sulphur etc. from natural gas and from combustion gases.

BACKGROUND OF THE INVENTION

Conventional systems for the absorption of acid gases employ a liquid solvent; typical solvents include amines such as methyldiethanolamine (MDEA), monoethanolamine (MEA) or diethanolamine (DEA) and mixtures of solvents. These solvents absorb $CO_2$, $NO_x$, $H_2S$ and other acid gases. The solvent is contacted with the sour gas mixture (gas mixture including acid gases) in a column which may be a packed column, a plate column or ii bubble-cap column, or a column with some other form of contact medium. In these systems, the gas and liquid streams flow countercurrently.

Conventional systems for the absorption of acid gases employ a liquid solvent; typical solvents include amines such as methyldiethanolamine (MDEA), monoethanolamine (MEA) or diethanolamine (DEA) and mixtures of solvents. These solvents absorb $CO_2$, $NO_x$, $H_2S$ and other acid gases. The solvent is contacted with the sour gas mixture (gas mixture including acid gases) in a column which may be a packed column, a plate column or a bubble-cap column, or a column with some other form of contact medium. In these systems, the gas and liquid streams flow countercurrently.

SUMMARY OF THE INVENTION

The prior art absorption systems suffer the disadvantage that in order to achieve a significant degree of gas/liquid contact, the columns have to be large and their operation is hampered by excessive foaming. In addition, the subsequent stripping section which removes the acid gas from solution must also be large, to handle the large volume of solvent used. Since the operation normally takes place under high pressure and the fluids involved are highly corrosive, the capital costs of the large columns and subsequent stripping section is high. Furthermore, operating costs and maintenance costs are high.

The prior art absorption systems suffer the disadvantage that in order to achieve a significant degree of gas/liquid contact, the columns have to be large and their operation is hampered by excessive foaming. In addition, the subsequent stripping section which removes the acid gas from solution must also be large, to handle the large volume of solvent used. Since the operation normally takes place under high pressure and the fluids involved are highly corrosive, the capital costs of the large columns and subsequent stripping section is high. Furthermore, operating costs and maintenance costs are high.

It is an object of the present invention to provide a system for removing acid gas from a sour gas mixture which does not suffer from the disadvantages of the prior art.

More generally, it is an object of the invention to provide a method of selectively absorbing one or more fluid components from a fluid mixture with a high degree of efficiency and more economically than in existing methods.

According to one aspect of the invention, there is provided a method of removing acid gas components from a gas mixture which comprises: bringing the gas mixture into contact with a liquid solvent or reagent for the acid gases in a first turbulent contactor; subjecting the gas mixture and liquid to turbulent mixing conditions in the first contactor thereby causing the acid gas to be absorbed by the solvent or reagent; passing the fluid mixture into a second turbulent contactor; subjecting the fluid mixture to further turbulent mixing conditions in the second contactor, thereby causing further acid gas to be absorbed by the solvent or reagent; and optionally separating a gas and liquid phase.

The invention also extends to the apparatus for carrying out this method.

The turbulent mixing is very intense and results in extremely efficient gas liquid contact. The mixing regime is preferably turbulent shear layer mixing. The liquid entrained in the gas may be in the form of droplets for gas continuous fluid phase distribution. The efficient mixing means that the absorption can take place very rapidly compared to that of a conventional absorption system. At the same time, the mixing system is simple and inexpensive, leading to reduced costs.

The rate of reaction for the absorption of the selected gas by the solvent or reagent is significantly higher in the turbulent contactor than downstream in the pipe following the venturi (hereafter referred to as the contactor line). Therefore, the presence of a second turbulent contactor reduces the residence time in the overall system while maintaining the same or improving the degree of absorption. This is particularly important in cases when the solvent employed has a low rate of absorption of the selected gas. Previously, a long residence time would require significant apparatus downstream, such as a long length of pipe, in which the rate of reaction is slower. This need for large lengths of pipe to generate residence time is avoided in the present invention.

In addition, conventional absorption methods involve the evolution of heat which must then be removed from the system. While the method of the invention is capable of operation with a relatively low pressure drop across the mixing means, when greater pressure drop is employed, a cooling effect is achieved and this may render the need for additional cooling unnecessary. In low-pressure applications, the ability of the system to operate with a low-pressure drop over each contactor may avoid the need for high duty compressors.

The absorption may be achieved by simply dissolving the gas or by way of a chemical reaction with the solvent or reagent.

Optionally, the fluid mixture is separated into a gas phase and a liquid phase between the two contactors. The entry conditions would then be similar to those of the first contactor. Preferably, the phase separation occurs in an annular flow generator. It is also possible to draw off the liquid solvent containing the selected gas and to use fresh liquid solvent in the second contactor. This would be particularly effective if the solvent was approaching saturation point on exit from the first contactor. The fresh solvent would have sufficient capacity to absorb most or all of the remaining gas component selected.

In a further application, a second selected gas could be withdrawn in the second contactor either using the same solvent or a different one. This solvent could be added at the second contactor as a fresh liquid or could be present in the liquid entering the first contactor.

Preferably, the method is carried out as a continuous process with the gas mixture and liquid flowing co-currently. The co-current flow eliminates the problems associated with foaming, since separation can easily be effected downstream of the contactor.

The first turbulent mixing may be achieved by any convenient means, such as an ejector or a jet pump or more preferably in a turbulent contactor comprising a vessel having a gas inlet, a liquid inlet, an outlet leading to a venturi passage, and a tube extending from the outlet back into the vessel. In a first embodiment of a turbulent contactor, the tube is spaced from the periphery of the outlet and may or may not be perforated. In a second embodiment, the tube is perforated and is arranged so that all the fluid which passes through the outlet does so by way of the tube.

In one regime, the gas mixture is supplied to the tube, optionally directly, and the liquid is supplied to the vessel, whereby the gas mixture draws the liquid into the venturi and the two phases are mixed. In another regime, the gas mixture is supplied to the vessel and the liquid is supplied to the tube, optionally directly, whereby the gas is drawn into the venturi by low pressure generated by the flow through the venturi, and the two phases are mixed. Alternatively, the liquid and the gas mixture are both supplied to the vessel, the liquid being supplied to a level above the level of the outlet, whereby the gas is forced out through the outlet via the tube, thereby drawing the liquid into the venturi so that the two phases are mixed. In a preferred embodiment, the tube is spaced from the periphery of the outlet, whereby the phase passing via the tube draws the phase in the vessel at the outlet into the outlet via the space between the tube and the outlet. Such a mixer is supplied by Framo Engineering A/S and is described in EP-B-379319.

The second turbulent mixing is preferably conducted in a turbulent contactor comprising at least one fluid inlet, an outlet leading to a venturi passage, and a tube extending from the outlet back into the contactor. Preferably, the second contactor has a gas inlet and a liquid inlet. The tube may or may not be perforated, and the gap between the tube and the outlet may be varied.

Preferably, the second turbulent contactor is located in a pipe extending from the venturi section of the first contactor. Said second turbulent contactor may also have a separate liquid inlet for the addition of fresh liquid solvent or reagent.

It will be appreciated that the invention is more broadly applicable than merely to the absorption of acid gas. Indeed, the principles of the invention may be applicable to any absorption application where the reaction kinetics are rapid. The invention is also applicable to chemical reactions with fast reaction kinetics, where good mixing of the reactants is a requirement.

More generally, therefore, the invention may be considered to extend to a method for effecting mass transfer between a first fluid and a second fluid, in which the first fluid includes a plurality of components and the second fluid includes a solvent or a reagent for one or more selected components of the first fluid, one fluid being in the gaseous phase, the other being in the liquid phase, the method comprising: subjecting the two fluids to turbulent mixing, thereby forming a homogeneous mixture, allowing a selected component to be absorbed by a respective solvent or reagent in the second fluid; passing the fluid mixture into a second turbulent contactor; and subjecting the fluid mixture to further turbulent mixing conditions in the second contactor, thereby allowing further absorption of a selected component by a respective solvent or reagent in the second fluid. Preferably, the fluid mixture is separated into a gas phase and a liquid phase between the two contactors.

Several of the components may be absorbed, either by a common solvent or reagent, or by respective solvents or reagents. In one possible regime, the first fluid is a gas mixture and the second fluid is in the liquid phase. In an alternative regime, the first fluid is a liquid mixture or a liquid solution and the second fluid is in the gas phase.

Again, the invention extends to the apparatus for carrying out these methods.

According to a more specific aspect of the invention, there is provided a method for removing one or more selected gas components from a gas stream which comprises: bringing the gas stream into contact with a liquid including a solvent or a reagent for a selected component in a first turbulent contactor; subjecting the gas stream and the liquid to turbulent mixing conditions in the contactor thereby causing a selected gas component to be absorbed by a respective solvent or reagent in the liquid; passing the fluid mixture into a second turbulent contactor; and subjecting the fluid mixture to further turbulent mixing conditions in the second contactor, thereby causing further absorption of the same selected gas component, or absorption of another selected gas component, by a respective solvent or reagent.

The invention may be particularly useful where selective absorption of one or more gases is required. This selective absorption may take place in a single turbulent contactor by adjustment of the residence time through the system. Alternatively, the selective absorption may take place in a multi-stage contactor. The method of the present invention allows for the absorption of a first selected component in a first contactor and a second component in a second contactor. The selected gases may be absorbed by the same solvent or reagent. In this case the selection is obtained by the different rates of reaction. In particular, the first absorption may be instantaneous and therefore occur almost exclusively in a first contactor, while the second gas is absorbed slower in a second contactor. An example of this process is the absorption of hydrogen sulphide ($H_2S$) in a first contactor followed by the absorption of carbon dioxide (CO) in a second contactor. The rate of reaction of $H_2S$ absorption in amine is so quick as to be virtually instantaneous.

In a second embodiment, the one or more selected gases may be absorbed by different solvents or reagents. The solvents or reagents may all be present in the liquid supplied to the first contactor, or the respective solvents or reagents for the second and subsequent gases may be added prior to the respective contactors.

Preferably, the fluid mixture is separated into a gas phase and a liquid phase between the two contactors. This phase separation may be achieved by any convenient means, preferably by an annular flow generator. The method is preferably carried out as a continuous process with the gas mixture and the liquid flowing co-currently.

The preferred features of the contactors and the methods of operation described above in connection with removing acid gas components from a gas mixture are equally applicable to the method described above.

The method may optionally include the further steps of: cooling the mixture after the second turbulent mixing; separating the cooled mixture into a gas phase and a liquid phase; removing the gas phase; subjecting the solvent in the liquid phase to a regeneration treatment to remove the absorbed selected gas component; and recycling the regenerated solvent-containing liquid phase to the mixture. The separation of the cooled mixture into a gas phase and a liquid phase may be achieved by any gas/liquid separator, such as a hydrocyclone.

Preferably, the regeneration is carried out by heating and/or by flashing off the absorbed gas component in a flash tank. Preferably, the post mixing cooling and the regenerative heating are achieved, at least in part by mutual heat exchange. Preferably, in instances where the gas mixture is at a low pressure, the liquid is pumped to the first turbulent contactor and thereby draws the gas mixture with it through the contactor.

Preferably, when the gas mixture is at high pressures, it is conveyed to the first turbulent contactor at a high pressure and thereby draws the liquid with it through the contactor.

The invention also extends to apparatus for carrying out such a method, comprising: a first turbulent contactor having a liquid inlet, a gas inlet and a fluid outlet; a second turbulent contactor having at least one fluid inlet and a fluid outlet; a cooler for the fluid stream from the fluid outlet of the second turbulent contactor; a hydrocyclone arranged to separate the cooled fluid stream into a gas phase and a liquid stream; a regenerator arranged to treat the separated liquid stream; and a recycle line arranged to convey the regenerated liquid stream to either the first or second contactor or to a reservoir tank.

The apparatus may include an annular flow generator between the two contactors. The apparatus may include a pump arranged to supply liquid to the liquid inlet of the first contactor. Preferably, the regenerator is a heater and/or a flash tank.

Preferably, the first turbulent contactor comprises a vessel having a gas inlet, a liquid inlet, an outlet leading to a venturi passage, and a tube extending from the outlet back into the vessel. In a first embodiment, the tube is spaced from the periphery of the outlet and may or may not be perforated. In a second embodiment, the tube is a perforated tube arranged so that all the fluid which passes through the outlet does so by way of the tube.

Alternatively the first turbulent mixing may take place in an ejector or a jet pump.

Preferably, the second turbulent contactor comprises at least one fluid inlet, an outlet leading to a venturi passage, and a tube extending from the outlet back into the contactor. Preferably, the second contactor has a gas inlet and a liquid inlet. Optionally, the second contactor is located in a pipe extending from the venturi section of the first contactor.

The invention may be considered to extend to the use of one or more turbulent contactors for selectively absorbing one or more gas components from a gas stream, in which the gas stream is brought into contact with a liquid including solvents or reagents for the selected gas components, the absorption rate of reaction for the selected gas components being different thereby causing the selected components to be absorbed separately. Optionally, a first selected component is absorbed in a first contactor and a second selected component is absorbed in a second contactor. In particular, the invention extends to the use of such a system when the gas stream is at high pressure and the first absorption is instantaneous.

The preferred features of any of the various aspects of the invention described above may be equally applicable to the other aspects of the invention.

The improved efficiency and selectivity possible for the removal of acid gases makes the present invention particularly valuable as awareness is increased of the potential damage to the environment that can be caused by acid gases in effluents such as combustion gas.

Furthermore, the small size of the apparatus compared to conventional absorption columns render the invention especially applicable to use in marine applications, such as on board shuttle tankers.

DETAILED DESCRIPTION OF THE DRAWINGS

Figure 1:
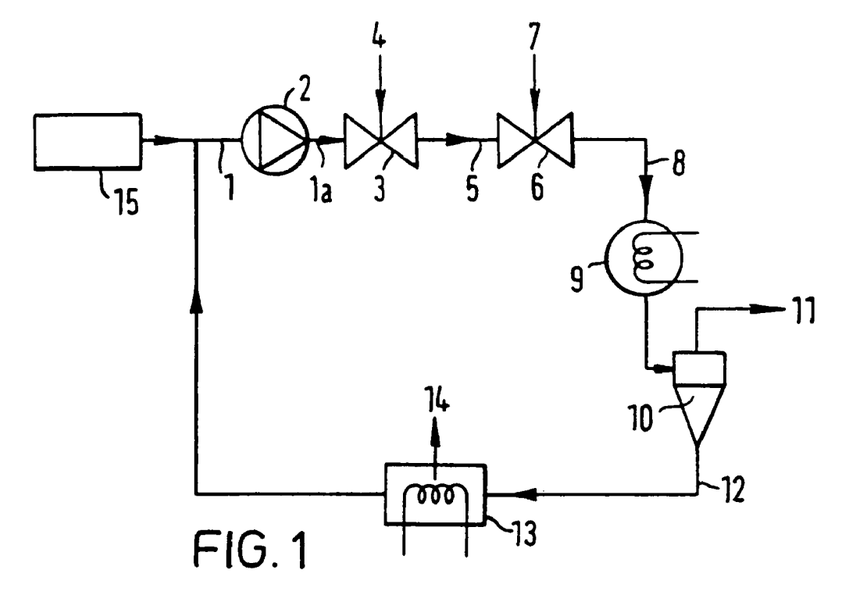
FIG. 1 is a flow diagram of the process for use when the gas is under low pressure.

In one embodiment of the invention, a continuous process operation for the removal of one or more selected gases from a gas stream is shown in FIG. 1. A liquid solvent stream 1, for example\MEA (monoethanolamine), is conducted by a pump 2 to a first turbulent contactor 3 (though this could be an ejector) capable of inducing turbulent mixing. A gas stream 4, including the gases which are to be removed, is drawn into the first contactor 3 by the low pressure generated in the venturi by the liquid stream after it has passed through the pump (stream 1a). This arrangement provides an automatic means of self-regulation as the gas mixture to solvent ratio can be maintained for varying flow rates. At the outlet of the first contactor 3 the liquid solvent and the gas stream are in the form of a homogeneous mixture (stream 5) and the mass transfer of the selected gases from the gas phase to the liquid occurs very rapidly.

The mixed two-phase stream 5 is then conveyed to a second turbulent contactor 6. If there are two different gases to be removed, the liquid solvent containing the first gas may be separated before entry into the second turbulent contactor. This separation may be via any suitable means, for example a hydrocyclone. The liquid solvent may be treated to remove the selected gas and then recycled through the first contactor.

The fluid mixture may be subjected to phase separation into a gas phase and a liquid phase by, for example, an annular flow generator (not shown) before entry into the second turbulent contactor. There may or may not be additional fresh liquid solvent added via stream 7, which may or may not be at the same pressure as the fluid in stream 5. Further mass transfer occurs in the second turbulent contactor. The same gas may be absorbed in the same reagent or a second gas may be absorbed in an appropriate reagent in the second contactor. This reagent may be the same as that for the first gas or may be different.

The mixed 2-phase stream 8 at the outlet of the second turbulent contactor is then conveyed to a cooler 9 and to a hydrocyclone 10. The "cleaned" gas stream 11 is taken off and the liquid stream 12 passes on to a regeneration system. At this point in the circuit all the selected gases are in the liquid phase (stream 12) and the gas stream 11 contains little of the selected gases. The selected gases may be $CO_2$, $H_2S$ or other acid gases to be removed from exhaust gas.

The regeneration of the liquid solvent is achieved by boiling off the selected gas in a heater 13. The selected gas is taken off as a gas stream 14 and the liquid solvent is optionally passed through a flash tank (not shown) to remove any residual dissolved gas before being recycled into the feed stream 1. The liquid solvent in stream 1 is topped up from the reservoir 15 as necessary to maintain a regular flow rate around the system.

It will be clear to a person skilled in the art that the cooler 9 and the heater 13 may be combined to form a heat exchange unit.

Figure 2:
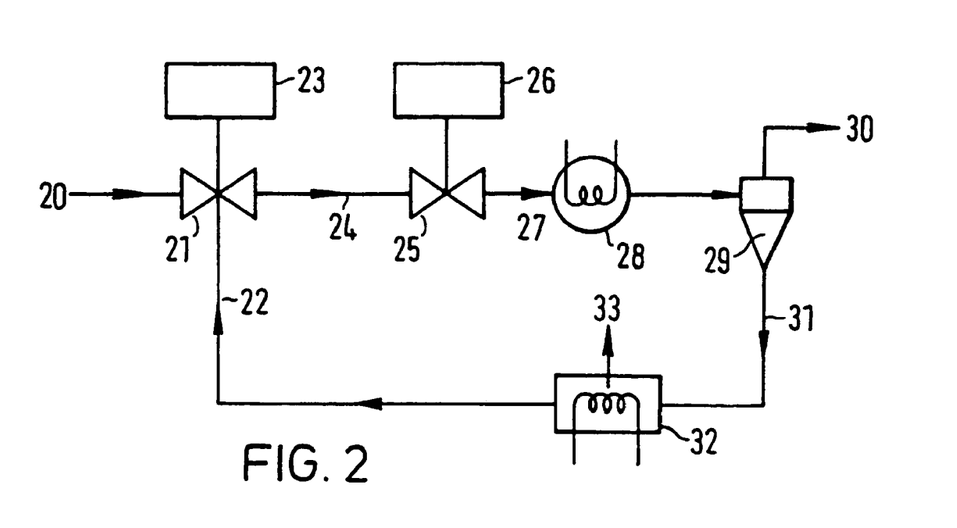
FIG. 2 is a flow diagram of the process for use when the gas is under high pressure.

An alternative system for the removal of selected gases from a high-pressure gas stream is shown in FIG. 2. A high-pressure gas stream 20 containing the selected gases which are to be removed is conveyed to a first contactor 21 similar to that shown in FIG. 3. The high pressure of the gas draws a controlled amount of liquid solvent, for example MEA, from the recycle stream 22 and, if necessary, from a reservoir 23 into the contactor 21.

At the outlet of the contactor 21 the two phases are in the form of a homogeneous mixture (stream 24) and the mass transfer of the selected gas from the gas stream to the liquid solvent takes place. The residence time may be as little as 0.1 seconds since, for example, the reaction kinetics for the absorption of $CO_2$ by MEA are very rapid. The required residence time will vary with the solvent used and the gas to be transferred from the gas to the liquid.

The two phase mixture (stream 24) may be separated into a gas phase and a liquid phase, for example by an annular flow generator (not shown), before entry into a second contactor 25. Alternatively, the liquid phase may be taken off and treated to remove the first selected gas thereby regenerating a first liquid solvent. Additional liquid may be added to the second turbulent contactor from a reservoir 26, either to include an appropriate solvent for the second selected gas, or to top up the liquid solvent to maintain a suitable flow rate around the system. Again, mass transfer occurs from the gas phase to the liquid phase in the second turbulent contactor.

The two-phase mixture (stream 27) passes through a cooler 28 to a hydrocyclone unit 29. The gas stream free of the selected gas(es) is taken off in stream 30 and the remaining liquid stream 31 including the selected gas(es) is passed to a regeneration system.

The liquid stream 31 is fed into a heater 32 to remove the selected gas(es) as a gas stream or streams 33. This regenerates the solvent for re-use in the system. This solvent (stream 22) is then drawn into the contactor 21 by the low pressure generated in the venturi by the high-pressure gas (stream 20) as explained above. Any shortfall in the solvent liquid is made up by addition from the reservoir 23. As in the first embodiment, the heater 32 and the cooler 28 can be combined to form a heat exchange unit.

Figure 3:
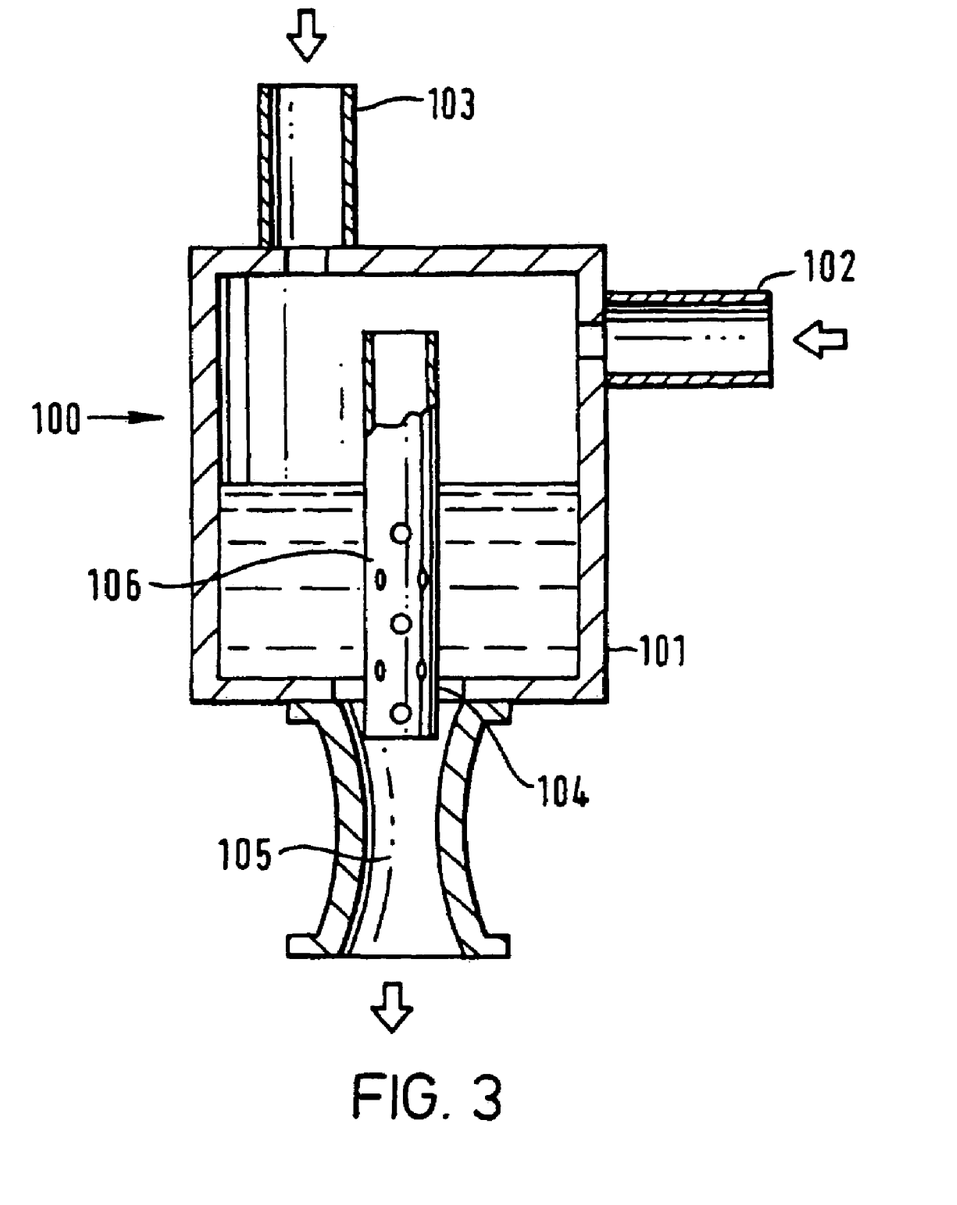
FIG. 3 is a view of a suitable first turbulent contactor.

The first turbulent contactor used in both the above embodiments may be that shown in FIG. 3. The turbulent contactor 100 comprises a vessel 101 having a gas inlet 102, a liquid inlet 103 and an outlet 104 leading to a venturi passage 105. There is a tube 106 (which may or may not be perforated) extending from the outlet 104 back into the vessel 101.

In a first arrangement, the gas mixture is supplied to the vessel 101 and the liquid is supplied to the tube 106 whereby the gas is drawn into the venturi by the liquid and the two phases are mixed.

In a second arrangement, the liquid is supplied to the vessel 101 and the gas mixture is supplied to the tube 106, whereby the liquid is drawn into the venturi by the gas and the two phases are mixed.

In a third arrangement, the liquid and the gas mixture are supplied to the vessel 101, the liquid being supplied to a level above the level of the outlet 104, whereby the gas is forced out through the outlet 104 via the tube 106, thereby drawing the liquid into the venturi so that the two phases are mixed.

Figure 4:
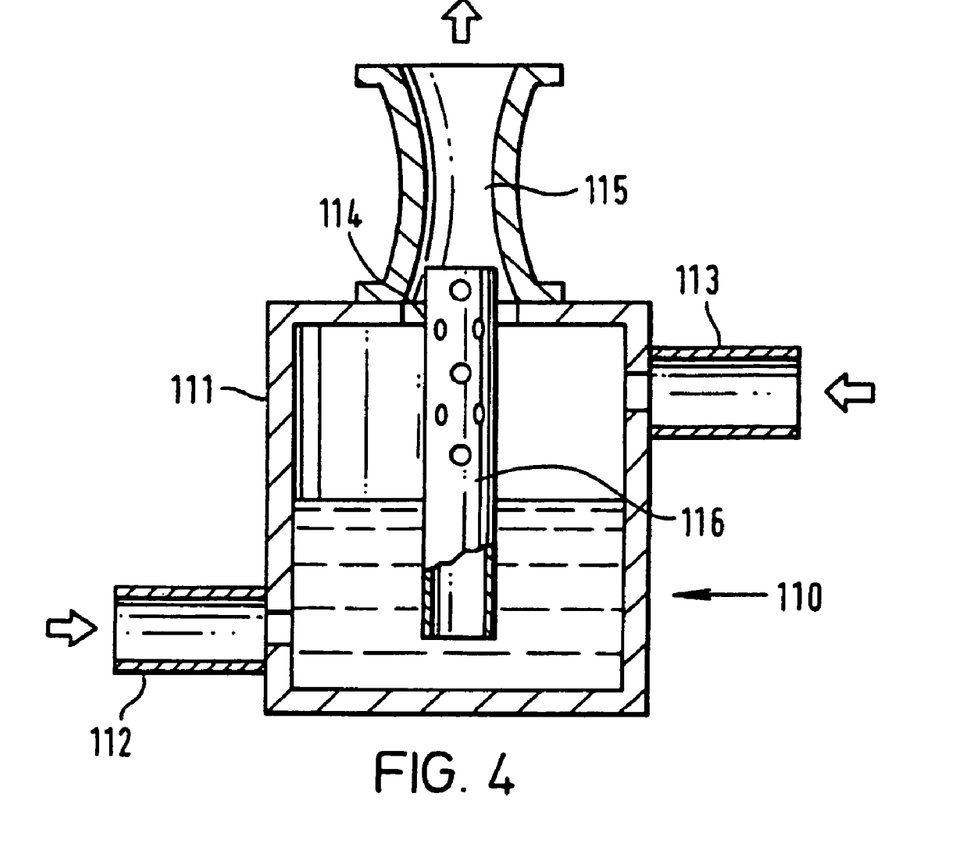
FIG. 4 shows an alternative first contactor design.

A fourth variant is shown in FIG. 4. This embodiment is similar to that shown in FIG. 3, but the contactor 110 is inverted. It comprises a vessel 111 with a liquid inlet 112, a gas inlet 113 and an outlet 114 leading to a venturi passage 115. There is a tube 116 (which may or may not be perforated) extending from the outlet 114 back into the vessel 111. The tube 116 may be connected directly to the gas inlet 113.

Figure 5:
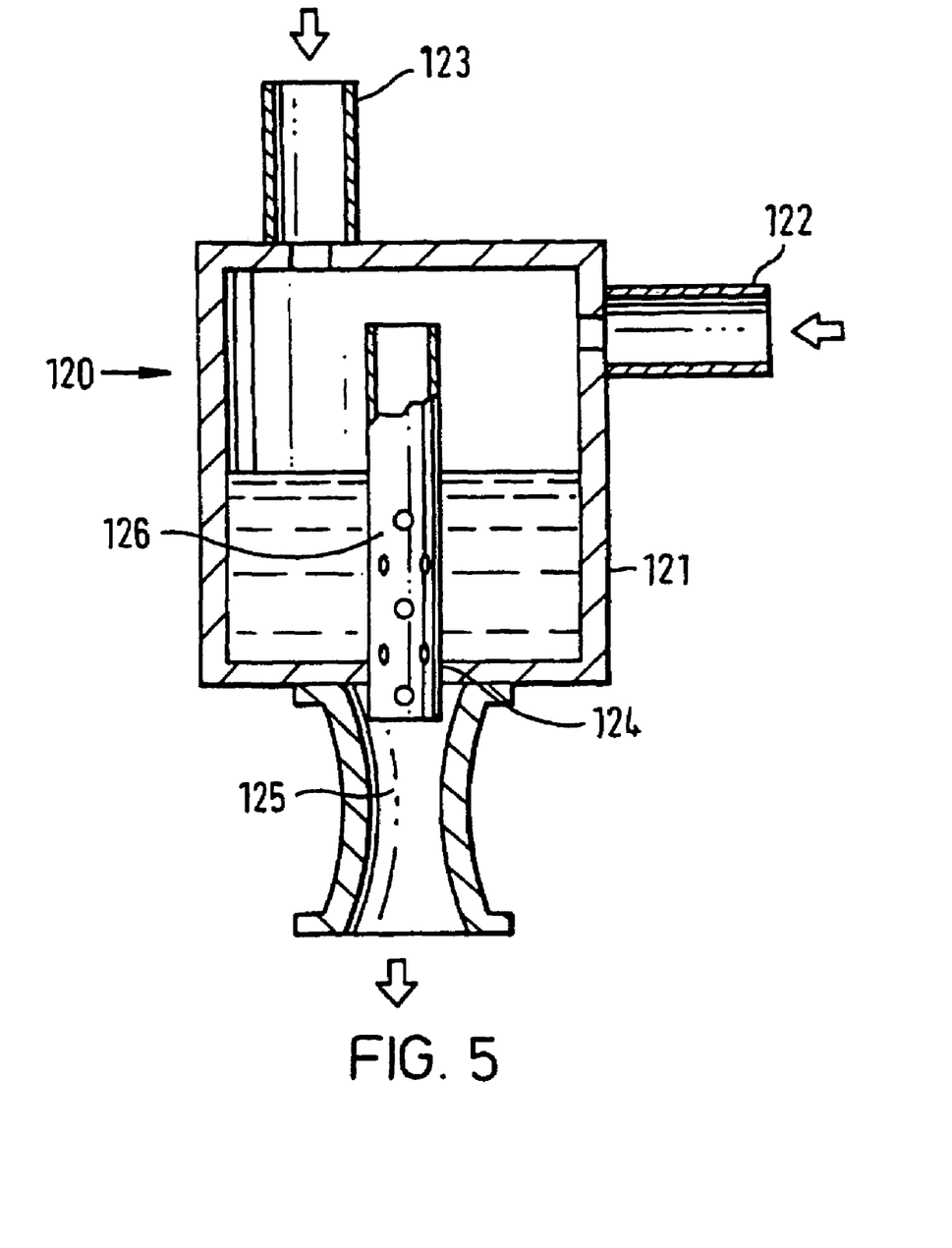
FIG. 5 shows a contactor similar to that in FIG. 3 but with the perforated tube arranged so that all the fluid which passes through the outlet does so by way of the tube.

The contactor may alternatively be that shown in FIG. 5. The turbulent contactor 120 comprises a vessel 121 having a first fluid inlet 122, a second fluid inlet 123 and an outlet 124 leading to a venturi passage 125. There is a perforated tube 126 extending from the outlet 124 back into the vessel 121. The perforated tube 126 is arranged such that there is no gap at the outlet 124 of the vessel 121 for the fluids to pass through. The result of this arrangement is that all the fluid exits the vessel 121 via the perforated tube 126.

In a first arrangement, the gas mixture is supplied to the vessel 121 and the liquid is supplied to the tube 126 whereby the gas is drawn into the venturi by the liquid and the two phases are mixed.

In a second arrangement, the liquid is supplied to the vessel 121 and the gas mixture is supplied to the tube 126 whereby the liquid is drawn into the venturi by the gas and the two phases are mixed.

In a third arrangement, the liquid and the gas mixture are supplied to the vessel 121, the liquid being supplied to a level above the level of the outlet 124, whereby the gas is forced out through the outlet 124 via the tube 126, thereby drawing the liquid into the venturi so that the two phases are mixed.

Figure 6:
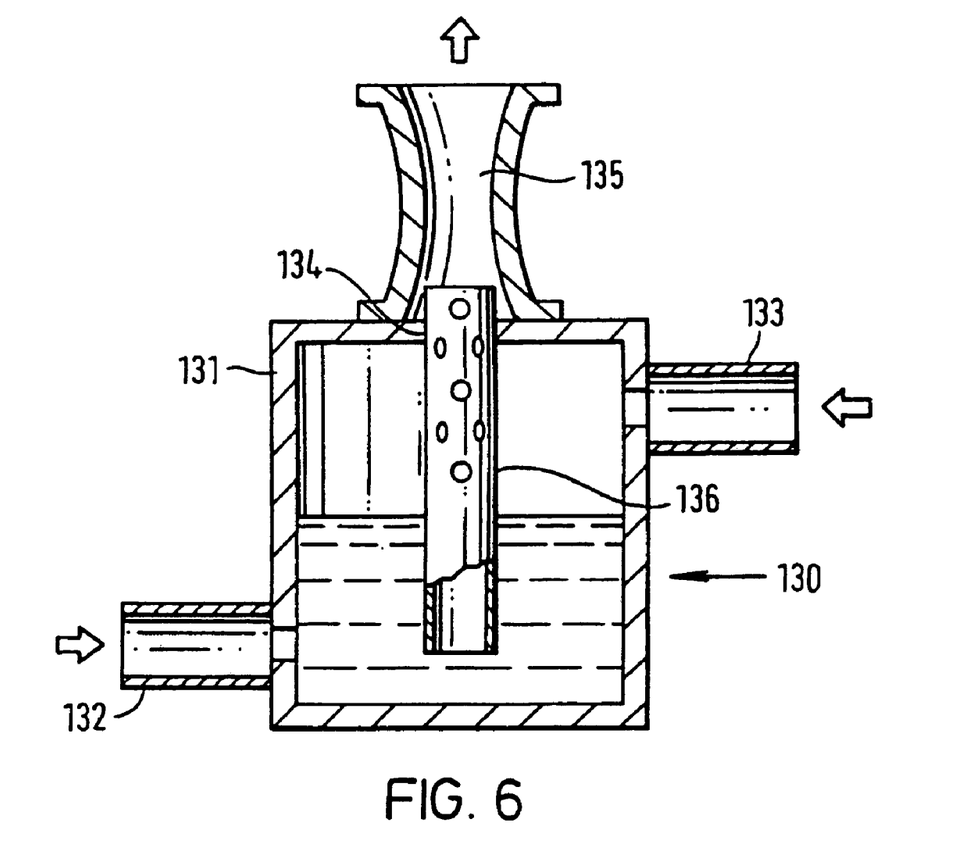
FIG. 6 shows a variant of the contactor shown in FIG. 5.

A fourth variant is shown in FIG. 6. This embodiment is similar to that shown in FIG. 5, but the contactor 130 is inverted. It comprises a vessel 131 with a liquid inlet 132, a gas inlet 133 and an outlet 134 leading to a venturi passage 135. There is a perforated tube 136 extending from the outlet 134 back into the vessel 131. As for the embodiment shown in FIG. 5, the perforated tube 136 is arranged such that there is no gap at the outlet 134 of the vessel 131 for the gas mixture to pass through. All the fluids must pass through the perforated tube 136 to the venturi passage 135.

In this embodiment, the liquid is forced up the tube 136 and the gas is drawn into the venturi passage 135 by the liquid and the two phases are mixed. Since the tube 136 is perforated, the gas is drawn into the tube 136 through the perforations.

Figure 7:
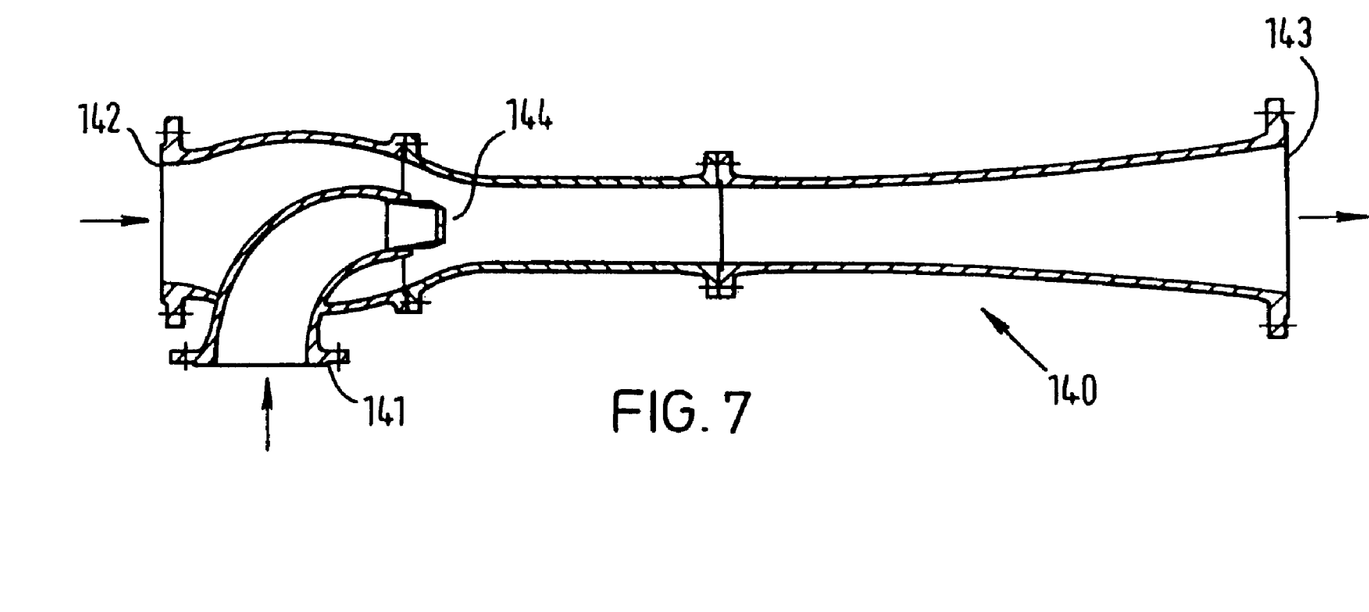
FIG. 7 shows a jet pump for use as an alternative to the contactors of FIGS. 3 to 6.

The first turbulent contactors referred to in the above embodiments may be replaced by jet pump arrangements which are capable of inducing turbulent mixing. FIG. 7 shows a jet pump 140 comprising a first fluid inlet 141 for the high-pressure fluid and a second fluid inlet 142 for the low-pressure fluid. The high-pressure fluid draws the low-pressure fluid along the length of the jet pump 140 to the outlet 143. The fluids are well mixed into a homogenised mixture in the region 144 at the outlet of the high-pressure inlet 141.

Figure 8:
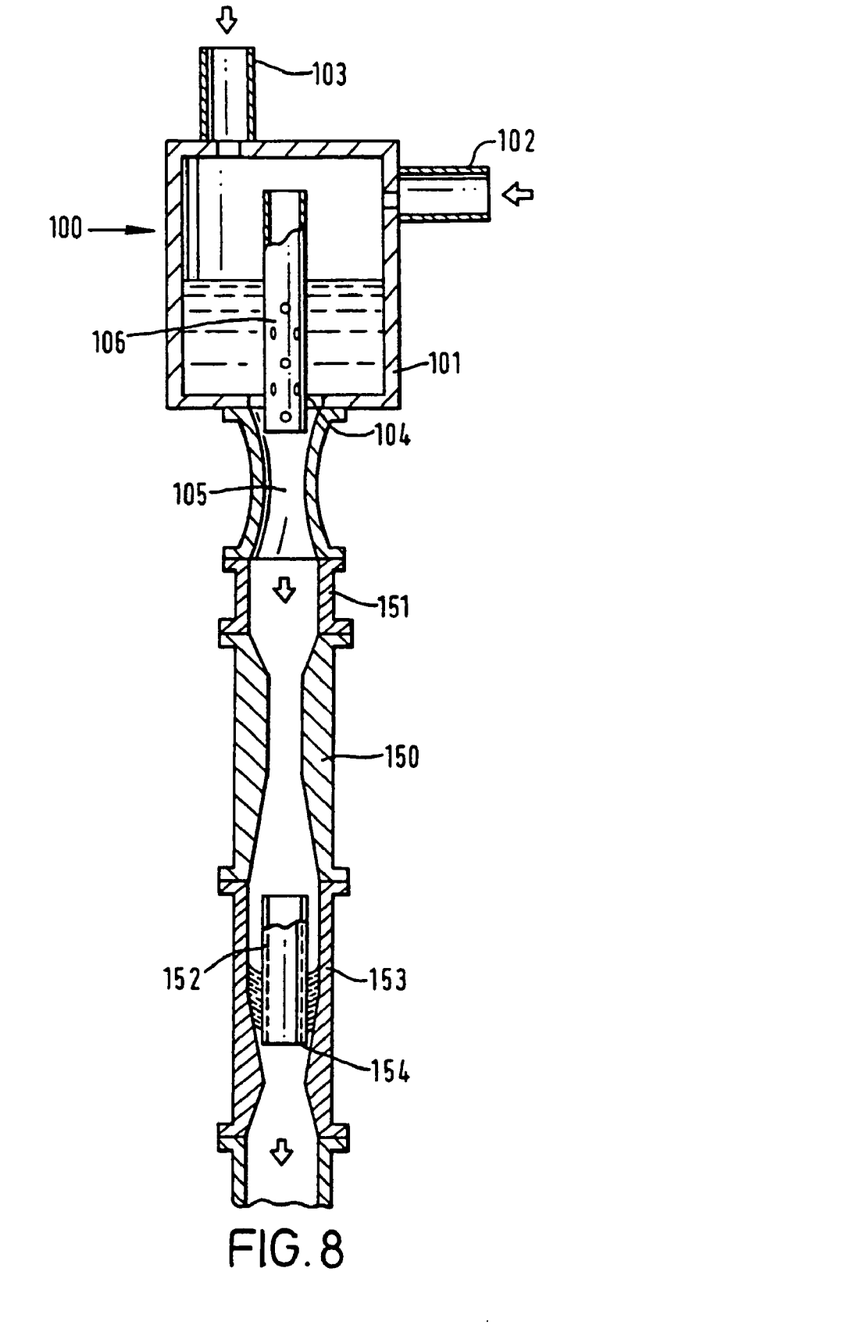
FIG. 8 shows a second turbulent contactor located in the pipe extending from the venturi section of the first turbulent contactor.

FIG. 8 shows an example of the second turbulent contactor being located in a pipe extending from the venturi section of the first contactor. In this example, the first turbulent contactor is the embodiment shown in FIG. 3, although other embodiments of the first turbulent contactor are equally applicable. The homogeneous gas/liquid mixture from the first turbulent contactor 100 enters an annular flow generator 150 from a spool piece 151, or directly from the diffuser of the venturi 105. As the gas/liquid mixture flows through the expanding outlet part of 150, a liquid film establishes at the wall to form an annular gas/liquid flow essentially with the gas in the pipe core and the liquid at the pipe wall. The liquid film will be maintained in the annulus between inner and outer pipes 152 and 153 respectively.

The conditions at the outlet 154 of the inner pipe 152 are similar to the conditions at the outlet 104 of the first turbulent contactor. Therefore, an additional stage has been added to the process. It is clear that, in principle, any number of stages can be added to the system, although considerations such as pressure drop should be taken into account.

The invention is not limited to the embodiment of the second turbulent contactor shown here. For example, a limited performance system can be operated without the annular flow generator 150 since there will be a certain liquid film flow on the walls of the pipe from the first turbulent contactor.

As stated previously, the second turbulent contactor may also be equipped with an inlet pipe from a liquid reservoir. This may either distribute additional fresh solvent to absorb the selected gas, or may add a second solvent or reagent chosen to remove a second selected gas component.

In one embodiment, the two or more contactors are used to selectively absorb one or more gas components from a gas stream. In this case, the absorption rate of reaction for the selected gas components is different causing the first selected component to be absorbed in the first turbulent contactor and the second selected component to be absorbed in the second turbulent contactor. This embodiment is particularly effective when a common solvent is used for each of the two or more gases and the first absorption is instantaneous. An example of this is the selective absorption of $H_2S$ and $CO_2$ from, for example, natural gas, using seawater as the solvent. In this case, all the $H_2S$ is absorbed virtually instantaneously in the first contactor and the $CO_2$ is absorbed in the second contactor. The liquid containing the $H_2S$ may be removed and regenerated between the two contactors.

In a second embodiment, the second contactor may be used to further remove the selected gas. This is particularly applicable in cases where the rate of absorption is slow. A second turbulent contactor will increase the amount of absorption without the need for large amounts of piping downstream of the contactor to provide the necessary residence time. In particular, the low pressure drop across these systems enable them to be used in low pressure situations where it would normally not be possible to use more than one contactor without using compressors.

The invention is further illustrated by reference to the following examples. These serve to verify the operating principles of the invention. In particular it is intended to show that the rate of reaction is faster in the contactors than in the pipe section downstream by comparing theoretical models with experimental results.

In a series of experiments conducted, the performance of prediction models for the absorption of $CO_2$ from a diesel engine exhaust was compared with the experimental results. The contactor used was a FRAMO contactor generally as described in EP 379319 and shown in FIG. 3. The mixer injection pipe was adjusted to yield a gas/liquid ratio of about 25 and a superficial mixture velocity of about 15 m/s in the contactor line. The exhaust gas was at a pressure of 0.3 barg. The solvent used was a 50% by volume mixture of water and MEA at a temperature of 10° C.

Figure 9:
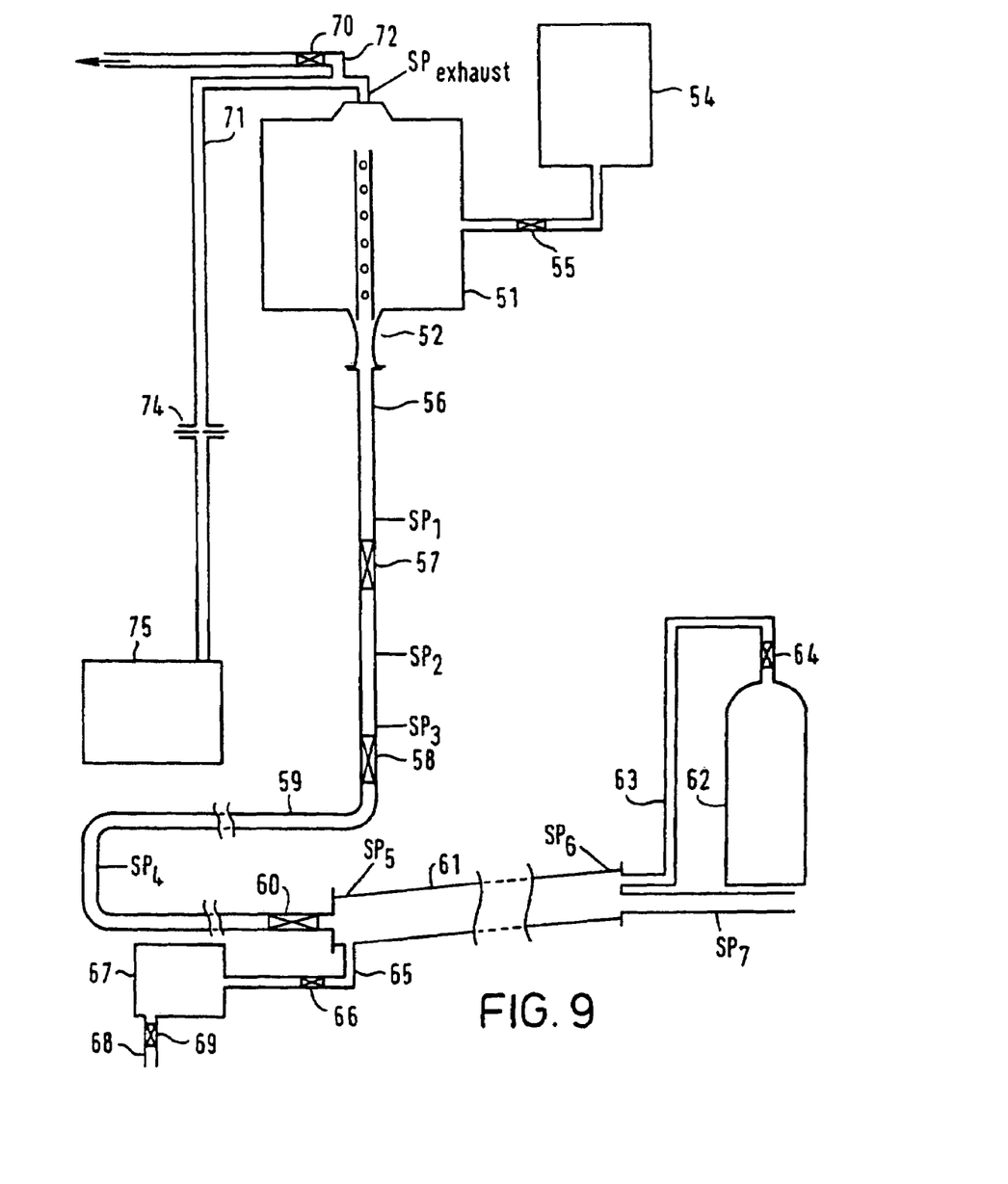
FIG. 9 is a block diagram of the apparatus as used in a series of experiments.

A schematic diagram of the apparatus for the series of experiments is shown in FIG. 9.

The apparatus in FIG. 9 comprises a contactor 51, corresponding to that shown in FIG. 3, a vertical pipe section 56 leading from the venturi 52, and a horizontal pipe section 59 joining the vertical section 56 to a receiver 61, and having quick closing valve 60. The vertical section 56 has two quick closing valves 57, 58. A reservoir of liquid solvent 54 leads to the contactor 51 via a valve 55. A diesel engine 75 has its exhaust connected to the contactor via a line 71 including an orifice plate 74. The line 71 is provided with a by-pass valve 70 in a by-pass line 72.

The receiver 61 is slightly inclined and has a liquid drain 65 at its lowest point, leading to a tank 67 via a valve 66. The tank 67 has an outlet 68 with a valve 69. The receiver 61 also has a gas cylinder 62 (not used) which can be used to pressurize the reservoir 61 via a line 63 with a valve 64.

Measurements are taken variously at five sampling points designated SP in FIG. 9. $SP_{Exhaust}$ is located at the exhaust entry to the contactor 51. SP, is 1 meter after the contactor with $SP_2$ and $SP_3$ within the next 1.5 meters. $SP_4$ is in a vertical portion of the pipe 59, $SP_5$ is at the entry to the receiver 61 and $SP_6$ is at the opposite end of the receiver 61. The final $SP_7$ is in the receiver outlet.

Figure 10:
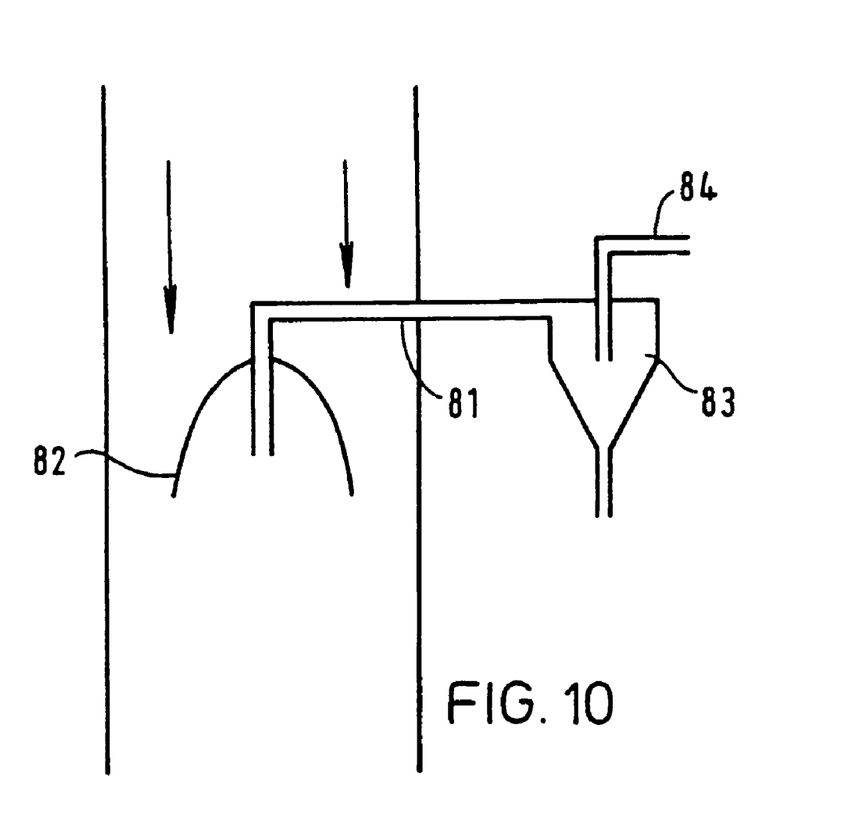
FIG. 10 is a schematic diagram of a sampling point.

Each sampling point, as shown in FIG. 10, comprises a centrally located sampling tube 81 opening in the downstream direction and protected by a cap 82. The cap serves to reduce liquid entrainment in the gas sample. The sampling tube leads to a hydrocyclone 83 which removes any residual moisture so that dry gas leaves the gas outlet 84 for analysis.

The contactor 51 and pipe section 56 were charged with liquid solvent from the reservoir tank 54. Exhaust gas from a YANNMAR 4TN84E 15 KVA water-cooled diesel engine 75 was used as the feed gas. A 30% load was placed on the diesel engine to increase the exhaust gas temperature and also to obtain a higher level of $CO_2$ in the exhaust gas. An even more elevated $CO_2$ level could be obtained by supplying $CO_2$ from a pressurized $CO_2$ gas bottle into line 71 (not shown in FIG. 9). The orifice plate 74 provided for continuous flow measurement of the exhaust gas.

The approach was based on sampling continuous flow in the pipe. The sampling probes were situated in the centre of the pipe with a cover, which accommodated the retrieval of a gas/liquid sample with low liquid content. This two-phase flow from each sampling was then routed through a gas/liquid cyclone from which a dry gas sample was taken from the gas outlet. [This arrangement with the sampling probe described could be repeated in seven different locations downstream of the first contactor as well as in the exhaust feed entering the contactor.] The sampling locations are shown on FIG. 9 and referred to in the Tables.

An experiment would commence by initially charging exhaust gas into the first stage contactor to the steady state pressure level experienced for a long run. The quick opening/closing valves were then triggered to open and two-phase flow admitted through the system. After steady state conditions were achieved, gas samples were taken from the sampling points. The residence times as reported in the Tables were calculated from the total flow rate of gas and liquid, local position in a given pipe section and the pipe length and diameter of the connected sections. The analyses were carried out using a Chromopack Model CP 2002 chromatograph.

The results of the experiments are shown in the Tables. The predicted concentrations listed in the Tables are calculated from models for the two sections in the overall system—the gas/liquid contactor and the contactor pipeline.

Looking first at the contactor pipeline, this serves to transport the gas-liquid mixture from the contactor to a gas/liquid separator, and to continue the $CO_2$ absorption from the gas mixture to the liquid solvent during the pipeline transport.

Unlike the flow through the gas liquid contactor, the flow is not exposed to any variations in pipe diameter. In normal operation the pipeline flow can therefore be classified as a steady state flow both with respect to time and position. The pipe flow regime and associated $CO_2$-absorption performance is then characterised by the local superficial gas and liquid velocities, the pipe inclination, the pressure level and the fluid properties. If the flow conditions correspond to annular-dispersed flow (high superficial mixture velocity) the $CO_2$ reduction rate of the gas mixture can be assumed to be a function of the local conditions only. Analogous to most attenuation/absorption processes in nature the reduction of $CO_2$ from the gas mixture obeys a first order differential equation:

$$\frac{dn_G}{dt} = -\frac{1}{\tau} \cdot n_G \cdot \left(1 - \frac{n_L}{n_{L\max}}\right) \quad (1)$$

where $n_G$ is the concentration of $CO_2$ in the gas mixture, $\tau$ is the characteristic time constant of the process, $n_L$ is the number of moles $CO_2$ in the solvent per unit volume of the solvent, $n_{Lmax}$ is the maximum number of moles $CO_2$ in the solvent per unit volume of the solvent (saturation).

For the system pressures and solvent types in concern:

$$\frac{d}{dt}\left(\frac{n_L}{n_{L\max}}\right) << -\frac{dn_G}{dt} \quad (2)$$

Which upon integration of equation (1) yields:

$$n_G = n_{G0} \cdot \exp\left(-\frac{1}{\tau} \cdot \left(1 - \frac{n_L}{n_{L\max}}\right)\right) \quad (3)$$

where $n_{G0}$ is the mole fraction $CO_2$ in the gas mixture at time t=0.

Equation (3) shows that the $CO_2$ in the gas mixture drops exponentially as the two-phase mixture of gas and solvent propagates along the contactor pipeline. The time t represents the residence in the pipeline as calculated from the superficial mixture velocity $U_m$ and the distance propagated by the two-phase mixture. The effect of partial $CO_2$ saturation of the solvent is observed to increase the characteristic time constant $\tau$ by a factor of $1/(1-n_L/n_{Lmax})$ and hence serves to reduce the absorption rate of $CO_2$ into the solvent. By measuring the mole fraction $CO_2$ at several positions along the contactor pipeline, the time constant $\tau$ can be determined experimentally. The time constant is assumed to be a function of superficial mixture velocity, gas/liquid flowrate ratio, solvent mixture, system pressure and temperature.

Turning now to a model for the gas-liquid contactor. Upstream of the mixing point the separated gas and liquid phases are guided into an annulus-venturi mixer geometry. Initially, the liquid flows in the annulus and the gas flows in the core of the conical shaped mixer pipe. Due to significantly different velocity profiles for the gas and the liquid at the mixing point, a high shear flow is generated in the contactor. This enhances the gas-liquid interaction and thus also the homogeneity of the gas-liquid phase distribution over the pipe cross section. As efficient absorption of $CO_2$ from the gas phase into the liquid solvent is associated with high interfacial area between the gas and the liquid, the combination of small liquid droplets, high droplet entrainment rate and homogeneous phase distribution is desired. These conditions are generally associated with high superficial mixture velocity in which annular-dispersed flow is the naturally occurring flow regime.

The modelling of the $CO_2$ absorption in the contactor locally obeys the same exponential decay law as shown in equation (3) above. However, as the pipe diameter is non-uniform and the interfacial area changes continuously during the contactor unit, the mole fraction of $CO_2$ in the gas phase at the exit $n_{G,exit}$ should be calculated by integrating along the contactor unit:

$$n_{G,exit} = n_{G,inlet} \cdot \exp\left(-\sum_{j=0}^{i} \frac{t_j - t_{j-1}}{\tau_j} \cdot \left(1 - \frac{n_{Lj}}{n_{L\max}}\right)\right) \quad (4)$$

where the contactor is split into a total of i sections. As the contactor is short compared to the contactor pipeline and fixed in length, a more practical version of equation (4) is applied for design purposes:

$$n_{G,exit} = n_{G,inlet} \cdot (1-x) \quad (5)$$

where x is the integral absorption efficiency for the contactor unit for the process conditions in concern. As for the time constant for the contactor pipeline, the absorption efficiency x is determined experimentally.

Typically, per unit length, the absorption rate in the contactor by far exceeds the absorption rate in the contactor pipeline. Thus in order to design and manufacture the separation device as compactly as possible, multistage mixing, effected by installing repeated contactor units, should be considered. If this is done, $n_{G,exit}$ the mole fraction of $CO_2$ in the gas mixture after a total of m identical mixers will be:

$$n_{G,exit} = n_{G,inlet} \cdot (1-x)^m \quad (6)$$

Here it is assumed that the flow conditions at the gas mixing point and through the contactor are comparable for the sequentially arranged contactors.

Combining the characteristics of m identical contactor units with absorption efficiency x and a contactor pipeline with characteristic time constant τ, the overall performance of the separator as used for design purposes can be described by:

$$n_G = n_{G0} \cdot (1-x)^m \cdot \exp\left(-\frac{t}{\tau} \cdot \left(1 - \frac{n_L}{n_{L\max}}\right)\right) \quad (7)$$

where $n_{G0}$ now is the mole fraction $CO_2$ in the gas mixture at the entrance to the contactor and t is the residence time in the contactor pipeline as calculated from the superficial mixture velocity and propagated distance in the pipeline. Again, the constants x and τ are assumed to be functions of superficial mixture velocity, gas/liquid flowrate ratio, solvent mixture, system pressure and temperature.

Figure 11:
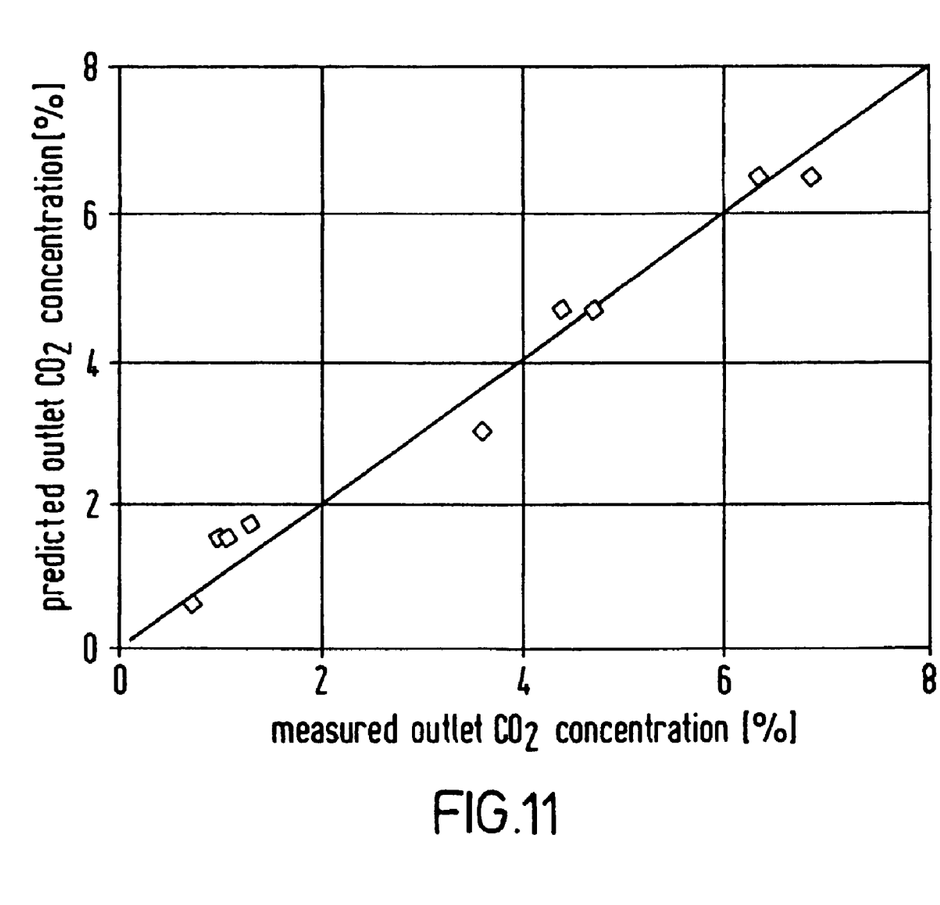
FIG. 11 is a graph of predicted outlet $CO_2$ concentration against measured outlet concentration in the turbulent contactor.

The performance of the prediction model for the absorption in the contactor, equation (5), is tabulated in Table 1 and illustrated in FIG. 11. As can be seen, the maximum variation between the predicted outlet concentration of $CO_2$ and the experimentally measured outlet concentration of $CO_2$ is 0.6%.

TABLE 1

$CO_2$ mole fraction in gas mixture (%)

| Inlet concentration Measured | Outlet concentration Measured | Outlet concentration Predicted |
|---|---|---|
| 3.9 | 1.0 | 1.5 |
| 3.9 | 1.1 | 1.5 |
| 11.9 | 4.4 | 4.7 |
| 11.9 | 4.7 | 4.7 |
| 16.5 | 6.9 | 6.5 |
| 16.5 | 6.4 | 6.5 |
| 4.4 | 1.3 | 1.7 |
| 1.6 | 0.8 | 0.6 |
| 7.7 | 3.6 | 3.0 |

Figure 12:
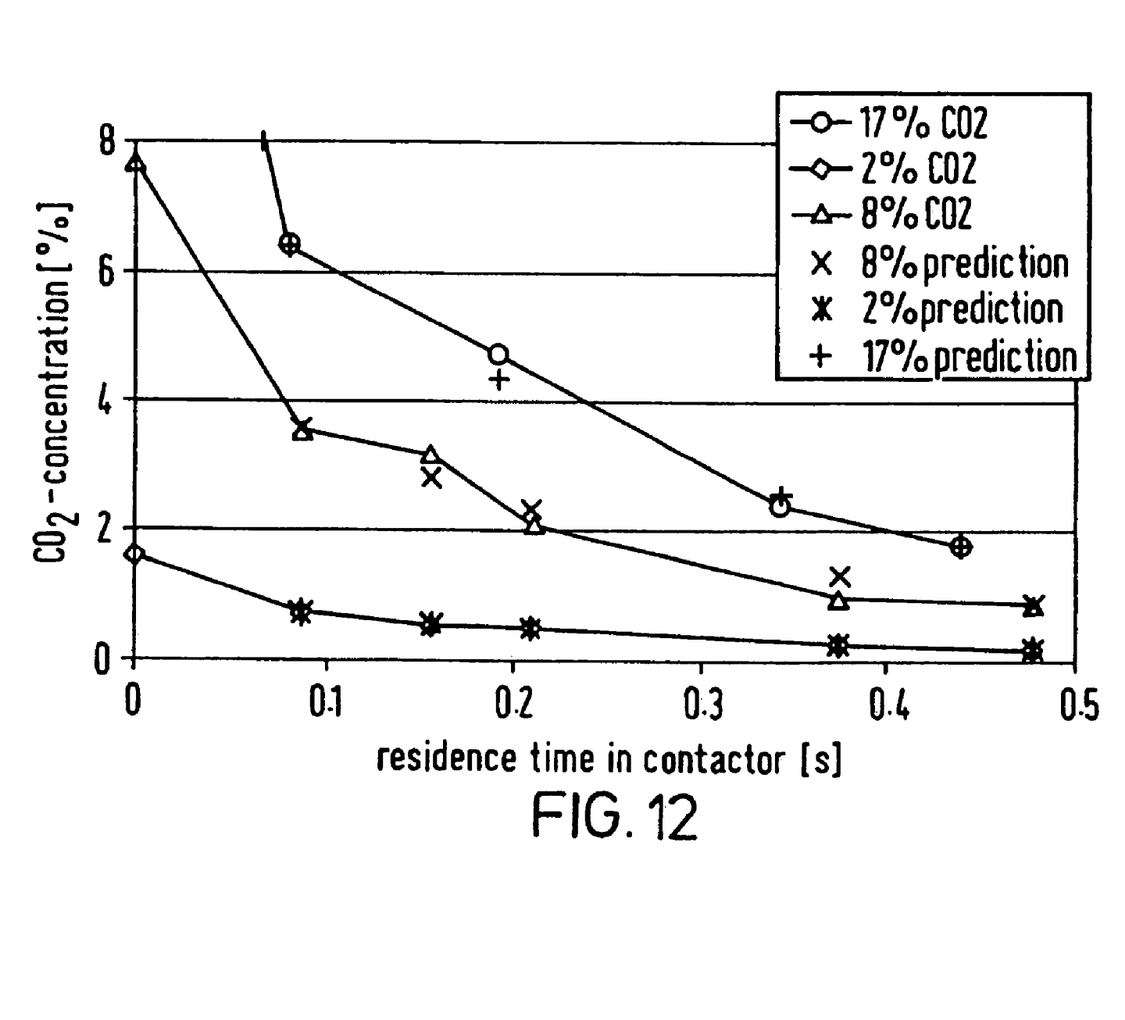
FIG. 12 is a graph of $CO_2$ concentration versus residence time in the contactor pipeline for different exhaust gas mixtures.

The performance of the prediction model for the absorption in the contactor pipeline, equation (3), is tabulated in Tables 2–4 and illustrated in FIG. 12. The tables correspond to the three different inlet concentrations of $CO_2$ selected, namely 2, 8 and 17%.

TABLE 2

Concentration v. residence time for exhaust gas with 2% initial $CO_2$

| | Position No. | | | | |
|---|---|---|---|---|---|
| | $SP_1$ | $SP_2$ | $SP_3$ | $SP_4$ | $SP_5$ |
| Residence time(s) | 0.09 | 0.16 | 0.21 | 0.38 | 0.48 |
| Measured concentration (%) | 0.75 | 0.55 | 0.50 | 0.25 | 0.19 |
| Predicted concentration (%) | 0.75 | 0.59 | 0.49 | 0.28 | 0.19 |

TABLE 3

Concentration v. residence time for exhaust gas with 8% initial $CO_2$

| | Position No. | | | | |
|---|---|---|---|---|---|
| | $SP_1$ | $SP_2$ | $SP_3$ | $SP_4$ | $SP_5$ |
| Residence time(s) | 0.09 | 0.16 | 0.21 | 0.38 | 0.48 |
| Measured concentration (%) | 3.60 | 3.20 | 2.12 | 1.00 | 0.90 |
| Predicted concentration (%) | 3.60 | 2.83 | 2.35 | 1.32 | 0.92 |

TABLE 4

Concentration v. residence time for exhaust gas with 17% initial $CO_2$

| | Position No. | | | |
|---|---|---|---|---|
| | $SP_1$ | $SP_2$ | $SP_3$ | $SP_4$ |
| Residence time(s) | 0.09 | 0.16 | 0.21 | 0.38 |
| Measured concentration (%) | 6.40 | 4.70 | 2.40 | 1.80 |
| Predicted concentration (%) | 6.40 | 4.32 | 2.55 | 1.83 |

The first measured point, at approximately 0.08s, is taken as the inlet concentration of $CO_2$ to the pipeline in equation (3). Hence, the predicted and measured values are set to be equal. The same time constant τ=0.29s has been applied for all three cases. You will see that the predicted values and the measured values are very similar (see FIG. 12).

It will be apparent to a person skilled in the art that the above results are not dependent upon the gas to be absorbed or on the solvent used to absorb that gas. Therefore it is clear that the above method of selective transfer of a gas from a mixture of gases to a liquid solvent for that gas is applicable to any gas and any respective solvent.

The invention claimed is:

1. A method for removing one or more selected gas components from a gas stream which comprises: bringing the gas stream into contact with a liquid including a solve it or a reagent for a selected component in a first turbulent contactor; subjecting the gas stream and the liquid to turbulent mixing conditions in the contactor thereby causing a selected gas component to be absorbed by a respective solvent or reagent in the liquid; passing the fluid mixture into a second turbulent contactor; and subjecting the fluid mixture to further turbulent mixing conditions in the second contactor, thereby causing further absorption of the same selected gas component, or absorption of another selected gas component, by a respective solvent or reagent; the method being a continuous process with the gas stream and liquid flowing co-currently, and at least one of the turbulent contactors comprising a vessel having a gas inlet, a liquid inlet, an outlet leading to a venturi passage, and a tube extending from the outlet back into the vessel.

2. A method as claimed in claim 1, in which the tube is perforated and/or is spaced from the periphery of the outlet, or is both perforated and spaced from the periphery of the outlet.

3. A method as claimed in claim 1, in which the gas mixture is supplied to the tube and the liquid is supplied to the vessel, whereby the gas mixture draws the liquid into the venturi and the two phases are mixed.

4. A method as claimed in claim 1, in which the gas mixture is supplied to the vessel and the liquid is supplied to the tube, whereby the gas is drawn into the venturi by the liquid and the two phases are mixed.

5. A method as claimed in claim 1, in which the liquid and the gas mixture are supplied to the vessel, the liquid being supplied to a level above the level of the outlet, whereby the gas is forced out through the outlet via the tube, thereby drawing the liquid into the venturi so that the two phases are mixed.

6. A method as claimed in claim 1, in which the first turbulent mixing is conducted in a jet pump.

7. A method as claimed in claim 1, in which the second contactor is located in a pipe extending from the venturi section of the first contactor.

8. A method as claimed in claim 1, in which the fluid mixture is separated into a gas phase and a liquid phase between the two contactors, the phase separation preferably occurring ill an annular flow generator.

9. A method as claimed in claim 1, in which fresh liquid solvent is added to the second turbulent contactor.

10. A method as claimed in claim 1, further comprising: cooling the mixture after the second turbulent mixing; separating the cooled mixture into a gas phase and a liquid phase; removing the gas phase; subjecting the solvent in the liquid phase to a regeneration treatment to remove the absorbed selected gas component; and recycling the regenerated solvent-containing liquid phase to the mixture.

11. A method as claimed in claim 10, in which the regeneration is carried out by heating, by flashing off the absorbed gas component in a flash tank, or by heating and by flashing off the absorbed gas component in a flash tank.

12. A method as claimed in claim 11, in which the post-mixing cooling and the regenerative heating are achieved, at least in part by mutual heat exchange.

13. A method as claimed claim 1, in which the liquid is pumped to a first turbulent contactor and thereby draws the gas mixture with it through the contactor.

14. A method as claimed claim 1, in which the gas stream is conveyed to a first turbulent contactor at a high pressure and thereby draws the liquid with it through the contactor.

15. An apparatus for removing a gas component from a gas stream comprising: a first turbulent contactor having a liquid inlet, a gas inlet and a fluid outlet; a second turbulent contactor having at least one fluid inlet and a fluid outlet, at least one of the turbulent contactors comprising a vessel having a gas inlet, a liquid inlet, all outlet leading to a venturi passage, and a tube extending from the outlet back into the vessel; a cooler for the fluid stream from the fluid outlet of the second turbulent contactor, a hydrocyclone or a gravity vessel arranged to separate the cooled fluid stream into a gas phase and a liquid stream; a regenerator arranged to treat the separated liquid stream, and a recycle line arranged to convey the regenerated liquid stream to either the first or second contactor or to a reservoir tank.

16. Apparatus as claimed in claim 15, including an annular flow generator between the two contactors.

17. Apparatus as claimed in claim 15, including a pump arranged to supply liquid to the liquid inlet of the first contactor.

18. Apparatus as claimed in claim 15, in which the regenerator is a heater, a flash tank, or a heater and a flash tank.

19. Apparatus as claimed in claim 15, in which the tube is perforated is spaced from the periphery of the outlet, or is perforated and is spaced apart from the periphery of the outlet.

20. Apparatus as claimed in claim 15, in which the first turbulent contactor is a jet pump.

21. Apparatus as claimed in claim 15, in which the second turbulent contactor is located in a pipe extending from the venturi section of the first contactor.

22. A method of using more than one turbulent contactor for selectively absorbing one or more selected gas components from a gas stream, comprising: using at least one turbulent contactor to bring the gas stream into contact with a liquid including solvents or reagents for the selected gas components, wherein an absorption rate of reaction for the selected gas components is different, thereby causing the selected gas components to be absorbed separately, wherein at least one of the turbulent contactors comprises a gas inlet, a liquid inlet, an outlet leading to a venturi passage and a tube extending from the outlet back upstream.

23. The method as claimed in claim 22, in which a first selected component is absorbed in a first contactor and a second selected component is absorbed in a second contactor.

24. The method as claimed in claim 22, in which the gas stream is at high pressure and the first absorption is instantaneous.

25. The method as claimed in claim 22, in which the tube is perforated, is spaced from the periphery of the outlet, or is perforated and is spaced from the periphery of the outlet.

26. The method as claimed in claim 22, in which the first contactor is a jet pump.

27. The method as claimed in claim 22, in which the second turbulent contactor is located in a pipe extending from the venturi section of the first contactor.

28. The method as claimed in claim 22, in which a gas phase and a liquid phase are separated after exit from a first turbulent contactor before entry into a second turbulent contactor, the phase separation preferably occurring in an annular flow generator.

* * * * *